United States Patent
Schneider

(10) Patent No.: US 11,473,963 B2
(45) Date of Patent: Oct. 18, 2022

(54) WIM SENSOR COMPRISING ELECTRO-ACOUSTIC TRANSDUCERS

(71) Applicant: KISTLER HOLDING AG, Winterthur (CH)

(72) Inventor: Damian Schneider, Winterthur (CH)

(73) Assignee: Kistler Holding AG, Winterthur (CH)

( * ) Notice: Subject to any disclaimer, the term of this patent is extended or adjusted under 35 U.S.C. 154(b) by 107 days.

(21) Appl. No.: 16/769,887

(22) PCT Filed: Nov. 20, 2018

(86) PCT No.: PCT/EP2018/081848
§ 371 (c)(1),
(2) Date: Jun. 4, 2020

(87) PCT Pub. No.: WO2019/115174
PCT Pub. Date: Jun. 20, 2019

(65) Prior Publication Data
US 2021/0181010 A1     Jun. 17, 2021

(30) Foreign Application Priority Data
Dec. 15, 2017   (EP) ..................................... 17207618

(51) Int. Cl.
*G01G 19/02*     (2006.01)
(52) U.S. Cl.
CPC .................................. *G01G 19/024* (2013.01)
(58) Field of Classification Search
CPC .... G01G 19/024; G01G 19/03; G01G 19/035; G01G 23/10
See application file for complete search history.

(56) References Cited

U.S. PATENT DOCUMENTS

| 4,193,130 A | 3/1980 | Young et al. |
| 5,196,846 A | 3/1993 | Brockelsby et al. |
| 5,260,520 A * | 11/1993 | Muhs ............... G01G 9/00 177/21 OR |

(Continued)

FOREIGN PATENT DOCUMENTS

| CN | 203203674 U | 9/2013 |
| CN | 104067140 A | 9/2014 |

(Continued)

OTHER PUBLICATIONS

Korean Office Action dated Jun. 18, 2021 and translation, 7 pages.
(Continued)

*Primary Examiner* — Natalie Huls
(74) *Attorney, Agent, or Firm* — Dority & Manning, P. A.

(57) ABSTRACT

The invention relates to a WIM sensor for detecting loads of vehicles on a roadway segment when a wheel of a vehicle crosses the WIM sensor arranged flush with the roadway surface in the roadway segment. The WIM sensor is formed as an elongated profile along a longitudinal axis and defines a space therein. A force sensor configured to generate a force sensor signal corresponding to a dynamic ground reaction force when the wheel crosses the force sensor is arranged in the space. An electro-acoustic transducer is arranged in the space and configured to measure sound waves and accordingly generate a transducer signal.

14 Claims, 5 Drawing Sheets

(56) References Cited

U.S. PATENT DOCUMENTS

| | | | | |
|---|---|---|---|---|
| 5,959,259 | A * | 9/1999 | Beshears | G01G 19/022 177/132 |
| 8,736,458 | B2 * | 5/2014 | Reynolds | G08G 1/02 340/666 |
| 10,809,120 | B2 * | 10/2020 | Minkoley | G01G 19/024 |
| 2007/0062289 | A1 * | 3/2007 | Heyman | G01G 9/00 73/597 |
| 2014/0190753 | A1 * | 7/2014 | Mian | G01G 19/047 177/1 |
| 2014/0309966 | A1 * | 10/2014 | Cornu | G01G 19/02 702/175 |
| 2014/0345955 | A1 | 11/2014 | Cornu et al. | |
| 2015/0025945 | A1 | 1/2015 | Kleven et al. | |
| 2015/0042304 | A1 * | 2/2015 | Cornu | G05F 5/00 323/303 |
| 2016/0018252 | A1 * | 1/2016 | Hanson | G01G 19/024 73/774 |
| 2019/0242693 | A1 * | 8/2019 | Noda | G06T 7/74 |

FOREIGN PATENT DOCUMENTS

| | | |
|---|---|---|
| EP | 2372322 | 10/2011 |
| EP | 2 756 983 B1 | 11/2015 |
| JP | 2006-317413 | 11/2006 |
| JP | 2014202515 A * | 10/2014 |
| JP | 2015-149061 A | 8/2015 |
| KR | 100985734 B1 * | 10/2010 |
| KR | 10-2015-0119908 A | 10/2015 |
| RU | 2448332 C1 | 4/2012 |
| WO | WO2013110389 A1 | 8/2013 |
| WO | WO 2017/196168 | 11/2017 |

OTHER PUBLICATIONS

Chinese Office Action dated Apr. 15, 2021 and translation, 19 pages.
Japanese Office Action dated Jul. 8, 2021 and translation, 11 pages.
Russian Office Action dated Dec. 21, 2020 and Translation, 9 pages.
Russian Search Report dated Dec. 21, 2020 and Translation, 4 pages.
International Search Report and Translation, dated Jun. 20, 2019, 6 pages.
Written Opinion of Searching Authority and Translation, dated Jun. 20, 2019, 6 pages.

\* cited by examiner

WIM SENSOR COMPRISING ELECTRO-ACOUSTIC TRANSDUCERS

CROSS REFERENCE TO RELATED APPLICATIONS

This application is a continuation of copending International Application No. PCT/EP2018/081848, filed Nov. 20, 2018, which is hereby incorporated herein in its entirety by this reference for all purposes.

FIELD OF THE INVENTION

The present invention relates to a WIM sensor comprising electro-acoustic transducers for detecting the total load of a vehicle.

BACKGROUND OF THE INVENTION

Weigh-in-Motion (WIM) systems are used in the transport sector for detecting the total load or axle load of a vehicle; or for determining the number of crossings of axles or vehicles over a segment of a roadway. For this purpose, a WIM system consists of at least one WIM sensor, further external sensors and an external evaluation member. In the following, a vehicle is understood to mean a vehicle or a combination of vehicles consisting of a towing vehicle and one or more trailers. Measures are taken on the basis of the detected total load or axle load of the vehicle that are appropriate to prevent damage of the roadway due to overload, determine use-dependent maintenance intervals of the roadway, determine payments that are dependent on the total load or axle load or on the number of axles of a vehicle, and to increase road safety, for example.

A load is a weight force, shortly called force, exerted by an object onto a surface. Accordingly, a wheel load is a force exerted by a wheel of a vehicle onto a road surface; an axle load is a force exerted by all wheels of an axle of a vehicle onto a roadway; and a total load is a force that is exerted by all wheels of a vehicle onto a road surface.

In the following, a wheel, double wheel and super single wheel are collectively designated by the generic term wheel. An axle is an axle having wheels or double wheels or super single wheels.

The WIM sensors of the WIM systems are embedded in the surface of the roadway so that each WIM sensor of a plurality of WIM sensors is inserted in the roadway surface next to each other WIM sensor of the plurality of WIM sensors along the direction of travel across a track of a vehicle in a longitudinal direction with respect to the direction of travel and each wheel track of a vehicle runs across a WIM sensor. Generally, the WIM sensor has the form of an elongated profile along a longitudinal axis. A wheel track is understood to mean the trajectory of a wheel of a vehicle on the roadway surface when the vehicle drives on the roadway. A track is understood to mean the entirety of all wheel tracks of a vehicle. However, a long WIM sensor may also extend across the entire track or it is possible monitor to only one wheel track of a vehicle by a WIM sensor. WIM sensors are often inserted in the roadway in two positions that are spaced apart from one another in the direction of travel wherein the known distance between these WIM sensors is used to determine the speed of a wheel between the spaced-apart WIM sensors. The WIM sensors transmit signals to the external evaluation member.

Usually, a WIM system that consists of a plurality of spaced-apart WIM sensors and an external evaluation member is sufficient to determine the wheel load, the number of crossing axles of vehicles and the speed of the crossing vehicle. For determining the wheel load or the axle load, each of the WIM sensors typically includes one or more piezoelectric force sensors.

The detection of the load of a wheel is performed by measuring dynamic ground reaction forces by means of at least one force sensor when a wheel crosses and by measuring the speed of a wheel. Here, ground reaction force means the force that counteracts the force that the wheel exerts onto the ground. The speed is typically calculated in the external evaluation member.

Assigning the crossing wheels or axles to a particular vehicle usually requires further external sensors in addition to the WIM sensor that detect the presence of a vehicle on the roadway segment such as for example induction loops inserted into the roadway surface in each track. However, also optical methods such as cameras, light barriers, light curtains or radar measurements or the like may be used for detecting the presence of a vehicle driving over a WIM sensor. The data of these further external sensors are recorded together with the data of one or more WIM sensors in an external evaluation member. These further external sensors add to the effort needed for installation and maintenance and ultimately to the required financial resources and time effort for assembling a WIM system.

To be able to clearly assign crossing wheels or axles to a particular vehicle will be essential for future applications of WIM systems which comprise without being limited to:
  Direct assessment of fines to overloaded vehicles based on a WIM measurement at full cruising speed.
  Direct assessment of fines to vehicles driving at excessive speed based on a WIM measurement at full cruising speed.
  Weight-based toll payment based on a WIM measurement at full cruising speed.
  Weight-based payment based on a WIM measurement in industrial applications (ports, mines, and the like).

The requirements placed on WIM systems for the points mentioned above are high. Thus, for the measurement of a total weight of a vehicle without any intervention of an operator by means of a WIM system, the International Organization for Legal Metrology (OIML) in its standard OIML R 134 recommends to detect the presence of a vehicle as well as to perform a consistency check of whether all wheels of a vehicle were detected. This will lead to an improvement in the accuracy of the recorded data, which improvement is of utmost importance when WIM systems are used for the above-mentioned applications.

Furthermore, also the costs of a WIM system play an increasingly important role. Users expect the installation to be as simple as possible with only a few components and, driven by the trend towards using networks that comprise a plurality of WIM systems, the WIM sensors to function as autonomously as possible.

A WIM system is known from US2014309966A, which is hereby incorporated herein by this reference for all purposes. Therein is disclosed a method for determining the total load of a vehicle by means of a WIM system while the vehicle drives on a roadway segment of a roadway; wherein of the crossing vehicle in this roadway segment both the wheel loads of all wheels and the speed of the vehicle are recorded during the entire crossing; wherein the wheel loads are detected by one or more WIM sensors; wherein the speed of the vehicle is detected by additional sensors such as radar, an array of beams arranged in the direction of travel, or by means of laser Doppler velocimetry procedures; wherein the assignment of the wheel loads detected to a specific vehicle is performed by using a device for detecting the end of the vehicle driving along a segment of the roadway, said device, for example, being a radiation grating established in a direction transverse to the road or induction loops built into the roadway surface; wherein the total load of the vehicle can be determined from the sum of all wheel loads that belong to one vehicle. This WIM system has the disadvantage that the detection of the end of the vehicle, i.e. the end of a presence of the vehicle crossing a WIM sensor, necessary to determine the total load of a vehicle requires additional separate sensors that are positioned in, next to or on top of the roadway so that the roadway segment must be blocked over a prolonged time for their installation and which incur additional costs with respect to the installation and maintenance of the WIM system.

SUMMARY OF THE INVENTION

A first object of the present invention is the determination of the total load of a vehicle on the basis of signals of a WIM sensor without using any additional external sensors and the associated reduction in costs and installation effort for WIM systems. It is another object to increase the accuracy of the WIM system. Each of these objects has been achieved by the features described below.

The present invention relates to a WIM sensor for detecting loads of vehicles on a roadway segment when a wheel of a vehicle crosses the WIM sensor; which WIM sensor is arranged in the roadway segment in the roadway surface and is inserted flush with the roadway surface; said WIM sensor having the shape of an elongated profile along a longitudinal axis and comprising at least one space; in which space is arranged at least one force sensor; which force sensor generates a force sensor signal; which force sensor signal corresponds to a dynamic ground reaction force during the crossing of the wheel, which wheel exerts a force onto the roadway segment; wherein at least one electro-acoustic transducer is arranged in the space; and wherein said electro-acoustic transducer measures sound waves which it provides as the transducer signal.

An electro-acoustic transducer is understood to mean a sensor that detects sound waves.

A vehicle traveling on a roadway segment generates sounds. These sounds or the sound waves emitted, respectively, are emitted due to the rolling of the wheels of a vehicle on the roadway surface or by an engine of a vehicle, among others, said sound waves spreading not only in the surrounding air but also in the roadway surface. The characteristic properties of these sound waves detected in a position in space are dependent on the distance to the source of the sound waves and on the propagation medium.

Sound waves are reflected on objects in space so that the presence of objects has a characteristic influence on the propagation of sound waves. Thus, a reflection of sound waves is known from mountain massifs, for example, where the propagation of the emitted sound waves is influenced in a characteristic manner. In the present case, sound waves are reflected from elements of a vehicle and, thus, also from the underbody of a vehicle. Therefore, these vehicle elements may be regarded as further sources of sound waves, which sound waves are superimposed on the originally generated sound waves. Further, the reflected sound waves also impinge on the roadway surface.

Therefore, the sound waves generated by a vehicle and the sound waves reflected on elements of the vehicle each spread in the roadway surface where they of course also pass through a WIM sensor inserted in the roadway surface. Accordingly, the sound waves also spread in a space in the profile of the WIM sensor.

A presence of a vehicle element in the vicinity of an electro-acoustic transducer inserted in the roadway surface is determined from a superposition of the above-mentioned sound waves by evaluating the signals detected by the electro-acoustic transducer.

The laws of propagation of sound waves are well-known so that it is possible to determine a position of a source of sound waves at a certain point in time by an arrangement comprising three or more electro-acoustic transducers and evaluation of the signals detected by the electro-acoustic transducers.

If the position of a source of sound waves is known at a specific point in time a trajectory of a source of sound waves can be determined by monitoring the positional change over time wherein said trajectory describes a dynamic positional change of a source of sound waves.

The electro-acoustic transducers are arranged in a space in the roadway surface, in particular in a space of a WIM sensor inserted in the roadway surface.

A WIM sensor that comprises at least one electro-acoustic transducer for detecting the presence of a vehicle in the vicinity of a WIM sensor is advantageous over a WIM system that measures a total load of a vehicle in the manner known from US2014309966A since no further separate external sensors besides the WIM sensor are required that would be needed for the determination of a presence of a vehicle in the area of the sensor for assigning individually determined wheel loads to the vehicle; and since by eliminating further separate external sensors the installation costs, maintenance costs and installation effort are reduced. In addition, the time of blocking the road for the installation of a WIM system may be reduced to less than eight hours. Furthermore, a microprocessor for signal processing incorporated in the WIM sensor enables autonomous use of the sensor and reduces the requirements posed on an external evaluation member.

BRIEF DESCRIPTION OF THE DRAWINGS

In the following, the invention will be explained in more detail by way of example referring to the figures in which.

DETAILED DESCRIPTION OF EXEMPLARY EMBODIMENTS

Figure 1:
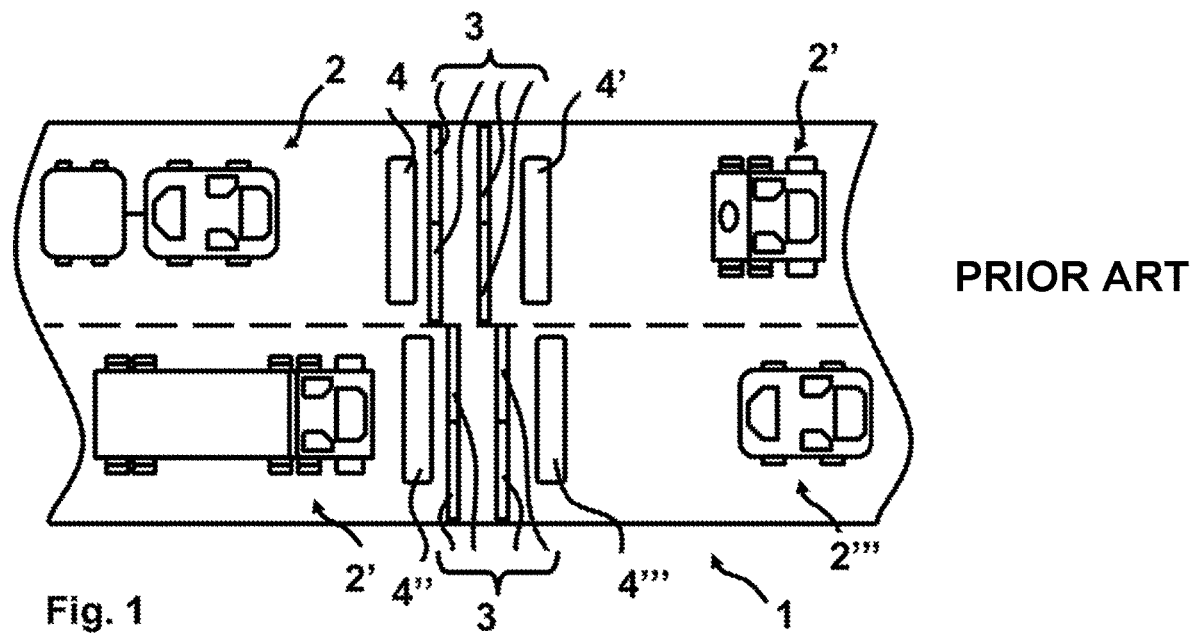
FIG. 1 shows a schematic partial view of a roadway segment with part of a WIM conventional system comprising WIM sensors and further external sensors for detecting a presence of a vehicle passing over a WIM sensor.

FIG. 1 shows a roadway segment 1 with parts of a WIM system according to the prior art for detecting the total load of a vehicle 2, 2',2",2''' by means of one or more WIM sensors 3 and a plurality of external sensors 4, 4',4",4''' for measuring the presence of a vehicle 2, 2',2",2''' that passes over a WIM sensor.

Figure 2:
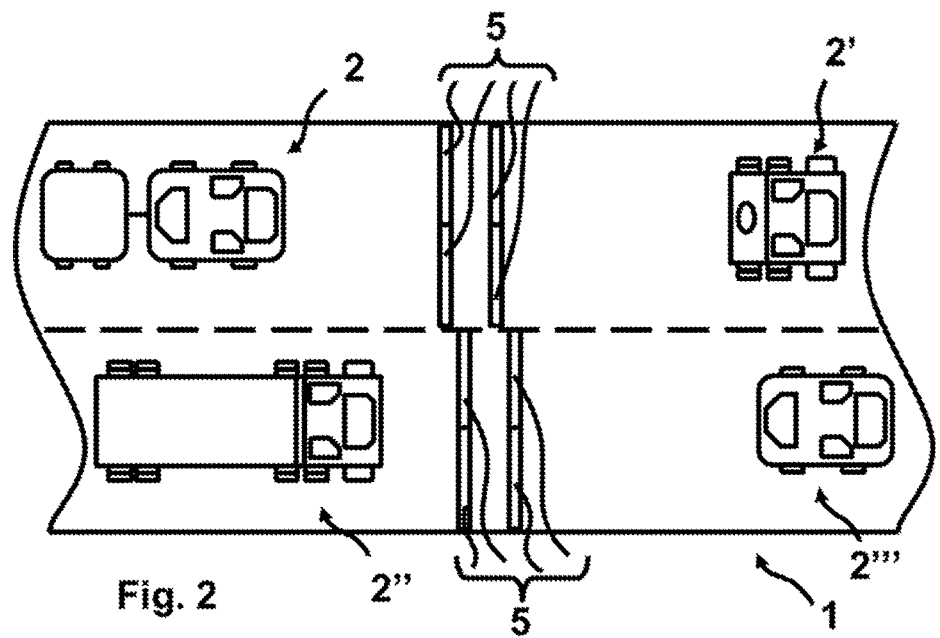
FIG. 2 shows a schematic partial view of a roadway segment with a first embodiment of part of a WIM system comprising WIM sensors with integrated sensors for determining a presence of a vehicle passing over a WIM sensor.
Figure 3:
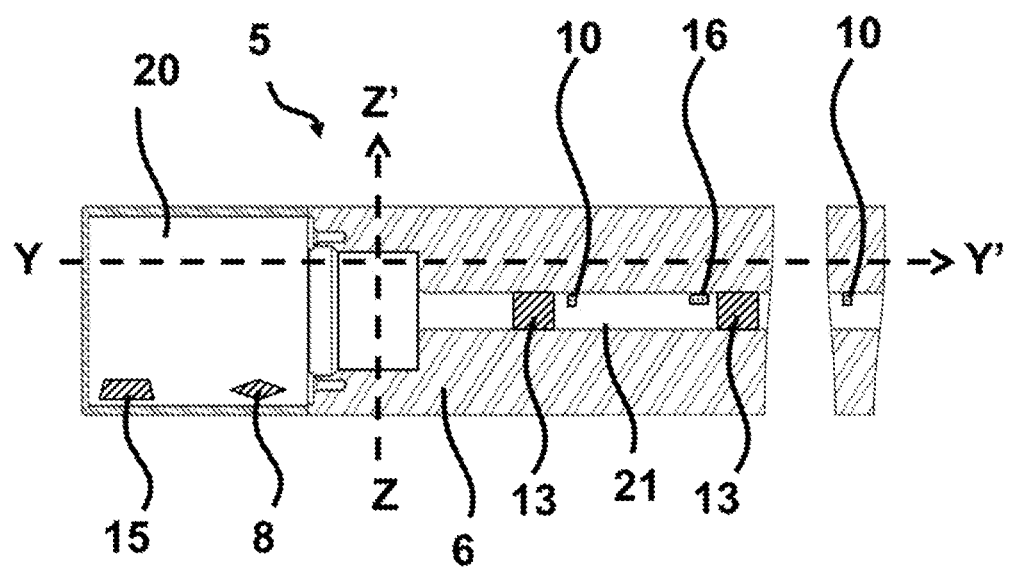
FIG. 3 shows a schematic partial view taken in cross-section in the YY' Z'Z plane through one of the WIM sensors 5 in FIG. 2 of an advantageous embodiment of a WIM sensor comprising integrated sensors for detecting a presence of a vehicle passing over a WIM sensor.
Figure 4:
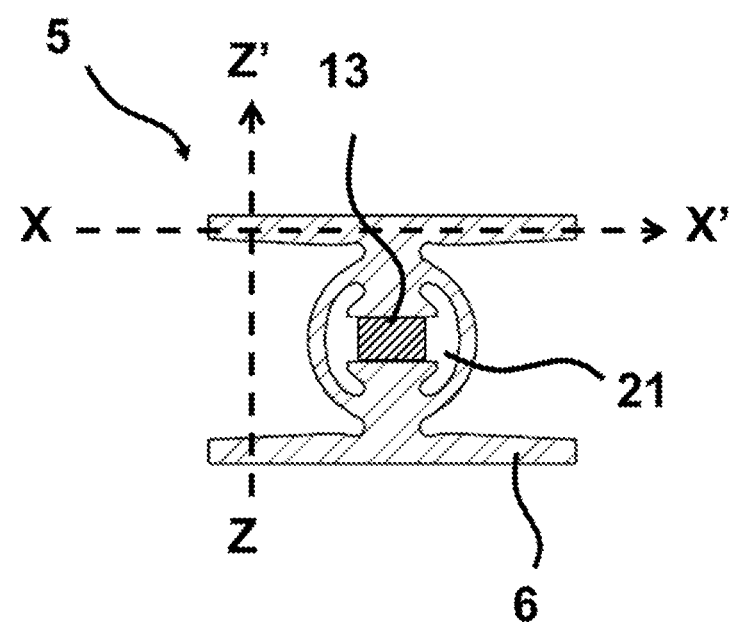
FIG. 4 shows a further schematic partial view taken in cross-section in the XX' Z'Z plane through one of the force sensors 13 in FIG. 3 of an advantageous embodiment of a WIM sensor comprising integrated sensors for detecting a presence of a vehicle passing over a WIM sensor.

FIG. 2 schematically shows a roadway segment 1 with parts of a WIM system in a first embodiment for detecting the total load of a vehicle 2, 2',2",2''' by means of at least two advantageous WIM sensors 5 arranged in the roadway segment spaced apart in the direction of travel XX' (shown in FIG. 4 for example) of a wheel; wherein the WIM sensor 5 is an elongated profile 6 as shown in FIGS. 3 and 4; in which profile 6 are formed one or more spaces 20, 21; wherein in one space 21 is arranged at least one force sensor 13 for detecting a wheel load or axle load.

Figure 7:
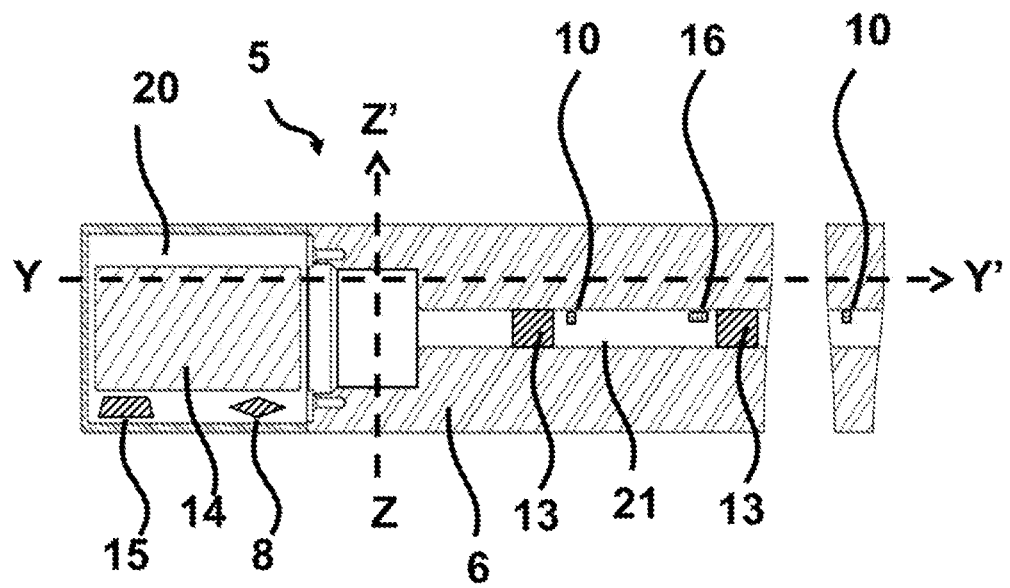
FIG. 7 shows a schematic partial view taken in cross-section in the YY' Z'Z plane through one of the WIM sensors 5 in FIG. 2 of another embodiment of a WIM sensor with power supply and integrated sensors for detecting a presence of a vehicle passing over a WIM sensor.
Figure 8:
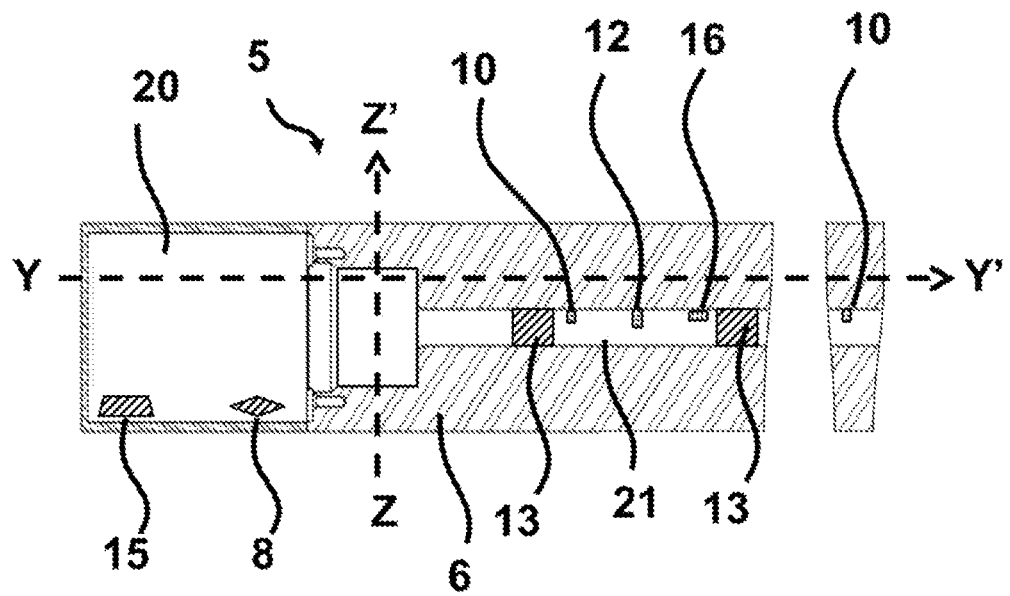
FIG. 8 shows a schematic partial view taken in cross-section in the YY' Z'Z plane through one of the WIM sensors 5 in FIG. 2 of another embodiment of a WIM sensor comprising a signal generator and integrated sensors for detecting a presence of a vehicle passing over a WIM sensor.

In a preferred embodiment, a space 20, 21 is understood to mean a chamber or cavity that is partially or entirely enclosed by the profile and which is present over the entire or part of the longitudinal axis Yr of profile 6. A space 21 is arranged entirely enclosed by the profile 6 as shown in FIGS. 3 and 4 for example. Moreover, also a space or chamber 20 may be arranged adjacent to one end of a profile 6 with respect to the longitudinal axis Yr as shown in FIGS. 3, 7 and 8. Thus, space 21 may be arranged within the profile 6 as shown in FIG. 4 with respect to the direction of travel XX' or with respect to the vertical direction ZZ', respectively. The vertical direction ZZ' is understood to mean the direction perpendicular to the roadway surface. As shown in FIGS. 3, 7 and 8, space or chamber 20 may also be adjacent to one end of profile 6.

Figure 6:
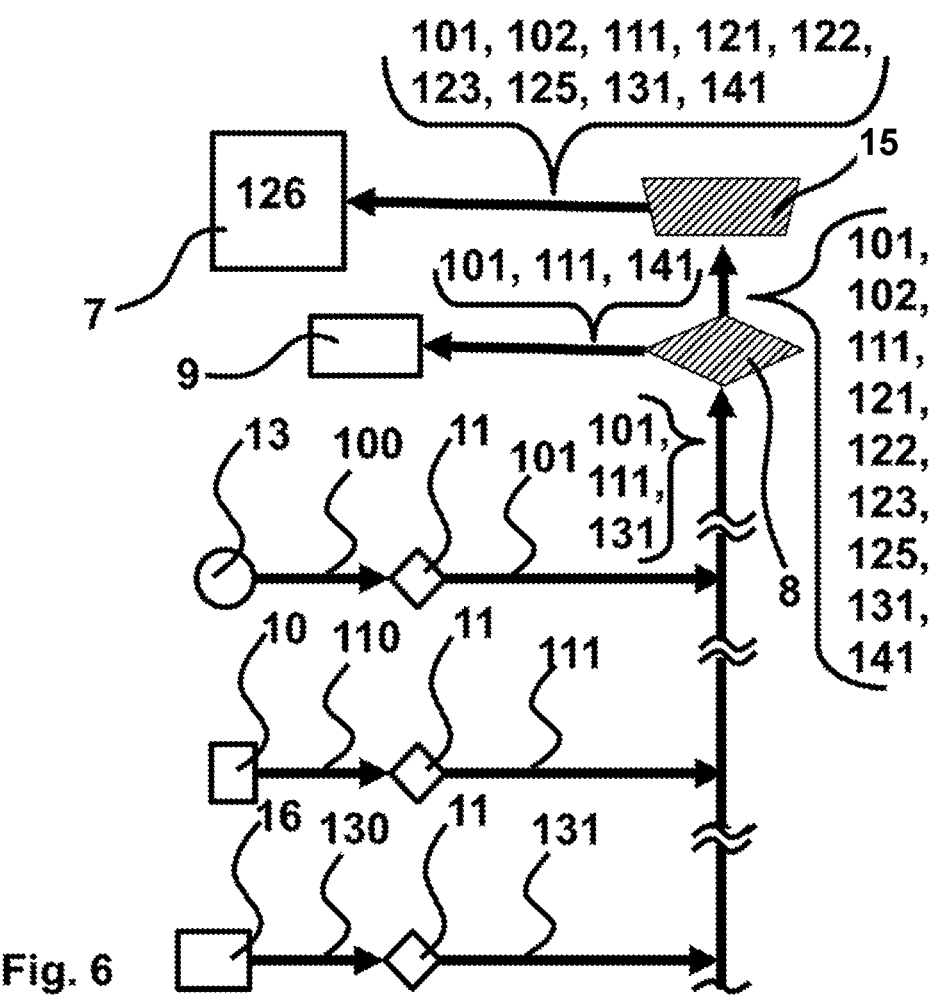
FIG. 6 shows a diagram for illustrating the signals of a WIM sensor in an advantageous embodiment wherein individual components of the WIM sensor are shown schematically in the diagram for reasons of clarity.

In a preferred embodiment, at least one electro-acoustic transducer 10 generating a transducer signal 110 and at least two A/D converters 11 are arranged in space 20, 21 as schematically shown in FIGS. 3 and 6 for example.

Furthermore, as schematically shown in FIGS. 3, 4 and 6-8 for example, at least one force sensor 13 is arranged in space 21; said force sensor 13 generating a force sensor signal 100 upon an action of a force onto the profile 6; wherein said force sensor signal 100 is converted into a digital force sensor signal 101 and provided by the first A/D converter 11; wherein at least one transducer signal 110 of at least one electro-acoustic transducer 10 is converted and provided by an A/D converter 11 and will be referred to below as the digital transducer signal 111.

In the following, the term providing a signal means that the signal provided is available for further use. Thus, providing also includes storing the signal in an electronic memory and loading the signal from this memory. Providing also includes displaying the signal on a display.

FIG. 6 is a schematic overview of the signals mentioned herein; wherein for better understanding also some of the components of the WIM system are shown.

In a preferred embodiment, a force sensor 13 includes at least one piezoelectric measuring member comprising electrodes and at least one charge amplifier; which piezoelectric measuring member generates a charge under the action of a force; said charge being available to the charge amplifier via electrodes; which charge amplifier converts the charge into a force sensor signal 100 and provides the force sensor signal 100; which force sensor signal 100 is an electrical signal, preferably an electrical voltage.

However, those skilled in the art may of course also choose a different embodiment of a force sensor 13 such as a strain gauge or a piezoresistive measuring member or a different measuring member which comprises or not an electrical amplifier or similar electrical circuit and which under the action of a force generates a signal that is equivalent to the force which the force sensor 13 provides as the force sensor signal 100.

Electro-acoustic transducer 10 has sensitivity for sound waves in the audible range from 20 Hz to 21 kHz, limits included, or in the ultrasonic range from 21 kHz to 1 GHz, limits included, or in the audible and ultrasonic range.

Furthermore, as schematically shown in FIGS. 3 and 6-8 for example, at least one microprocessor 8 and at least one non-volatile memory member 9 are arranged in the space 20, 21.

In a preferred embodiment, at least one digital force sensor signal 101 and at least one digital transducer signal 111 are available to be processed in the microprocessor 8.

At least one digital force sensor signal 101 and at least one digital transducer signal 111 are detected in the microprocessor 8 in a temporally synchronized manner. A temporally synchronous detection of at least one digital force sensor signal 101 and a digital electro-acoustic signal 111 is understood to mean an unambiguous assignment of the detected digital force sensor signal 101 to the simultaneously measured digital electro-acoustic signal 111. A digital force sensor signal 101 is measured simultaneously to a digital transducer signal 111 if the digital force sensor signal 101 and the digital transducer signal 111 are detected according to well-known digital signal transmission technology with normal effort at a same value of an internal timer of the microprocessor 8.

A temporally synchronous detection of at least two digital force sensor signals 101 is understood to mean an unambiguous association between the two simultaneously measured digital force sensor signals 101. Two digital force sensor signals 101 are measured simultaneously if the digital force sensor signals 101 are detected according to well-known digital signal transmission technology with normal effort at a same value of an internal timer of the microprocessor 8. It should be understood that two synchronously detected digital force sensor signals 101 originate from at least two separate force sensors 13.

In a preferred embodiment, a space 20, 21 is understood to mean a chamber or cavity that is partially or entirely enclosed by the profile and which is present over the entire or part of the longitudinal axis YY' of profile 6. A space 21 is arranged entirely, enclosed by the profile 6 as shown in FIGS. 3 and 4 for example. Moreover, also a space or chamber 20 may be arranged adjacent to one end of a profile 6 with respect to the longitudinal axis YY' as shown in FIGS. 3, 7 and 8. Thus, space 21 may be arranged within the profile 6 as shown in FIG. 4 with respect to the direction of travel XX' or with respect to the vertical direction ZZ', respectively. The vertical direction ZZ' is understood to mean the direction perpendicular to the roadway surface. As shown in FIGS. 3, 7 and 8, space or chamber 20 may also be adjacent to one end of profile 6.

The algorithm is configured to compare the loaded characteristic signature and the digital transducer signal 111 and when the algorithm finds a match the algorithm is configured to determine that a vehicle 2, 2' 2" 2''' is present passing over the WIM sensor 5 and accordingly the algorithm generates positive presence information 121. Otherwise, the algorithm is configured to generate negative presence information 121.

Furthermore, as schematically shown in FIGS. 3, 4 and 6-8 for example, at least one force sensor 13 is arranged in space 21; said force sensor 13 generating a force sensor signal 100 upon an action of a force onto the profile 6; wherein said force sensor signal 100 is converted into a digital force sensor signal 101 and provided by the first A/D converter 11; wherein at least one transducer signal 110 of at least one electro-acoustic transducer 10 is converted and provided by an A/D converter 11 and will be referred to below as the digital transducer signal 111.

Figure 5:
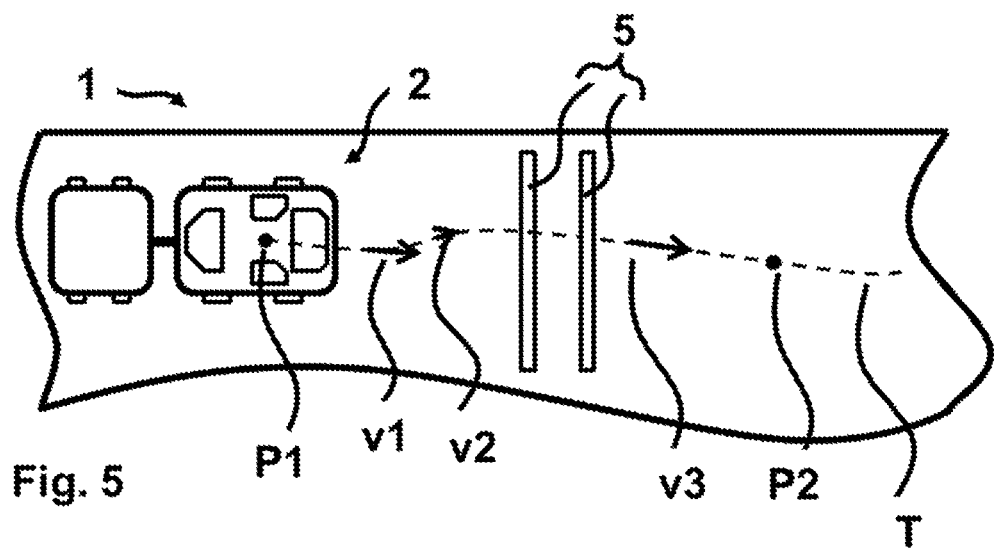
FIG. 5 shows a schematic partial view of a roadway segment with a first embodiment of part of a WIM system comprising a WIM sensor with integrated sensors for detecting a presence of a vehicle passing over a WIM sensor as well as a representation of a determined trajectory of a vehicle and of speeds at different positions on the trajectory of the vehicle.

Referring to FIGS. 5 and 6 for example, the vehicle position information 122 together with the temporal change in vehicle position information 122 in the vicinity of the WIM sensor 5 is used by the algorithm to generate the trajectory T of the vehicle 2, 2',2",2'''. The trajectory T is provided by the algorithm as the vehicle trajectory information 123. The trajectory T is a time-dependent mathematical trajectory in a three-dimensional coordinate system. Therefore, the first derivative of the trajectory with respect to time is the speed of the vehicle 2, 2',2",2''' in the vicinity of the WIM sensor 5 shown as v1, v2, v3 in FIG. 5. The second derivative with respect to time of the trajectory is the acceleration of the vehicle 2, 2'2"2''' in the vicinity of the WIM sensor 5.

The acceleration of a vehicle 2, 2',2",2''' acts on force sensor 13 as an additional force component and thereby influences the digital force sensor signal 101 detected. Thus, when the vehicle 2, 2',2",2''' brakes (negative acceleration), the force exerted by the front wheels of a vehicle 2, 2',2",2''' onto the roadway surface is increased by a force component which is proportional to the negative acceleration of the vehicle 2, 2',2",2''' and the weight of the vehicle 2, 2',2",2''' while the force exerted on the roadway surface by the rear wheels of the vehicle 2, 2',2",2''' is reduced by a force component proportional to the acceleration and the weight of the vehicle 2, 2',2",2'''.

Likewise, at a radial acceleration of a vehicle 2, 2',2",2''' moving along a curved trajectory in the three-dimensional coordinate system an additional force component acts onto the force sensor 13 thereby affecting the detected digital force sensor signal 102. Thus, in the case of a left turn made by vehicle 2, 2',2",2''' the force exerted on the roadway surface by the right wheels of the vehicle 2, 2',2",2''' is increased while the force exerted on the roadway surface by the left wheels of the vehicle 2, 2',2",2''' is reduced each by a force component that is proportional to the radial acceleration of the vehicle 2, 2',2",2''' and to the weight of the vehicle 2, 2',2",2'''.

From the vehicle trajectory information 123 and the digital force sensor signals 101 the algorithm is configured to calculate corrected digital force sensor signals 102 of the wheels of a vehicle 2, 2',2",2''' passing over the WIM sensor 5. From the vehicle trajectory information 123 the algorithm is configured to calculate the acceleration or radial acceleration of the vehicle 2, 2',2",2''' at the position of the force sensor 13 and from the detected force that a wheel exerts onto the force sensor 13 the algorithm is configured to calculate the fraction of the force (force component) which is generated by the acceleration of the vehicle 2, 2',2",2''', and is configured to calculate the difference between this force component and the detected digital force sensor signal 101 and to use this difference to generate the corrected digital force sensor signal 102. Therefore, in accordance with the present invention, the corrected digital force sensor signal 102 is independent of the force exerted onto the roadway segment by an acceleration or radial acceleration of the vehicle 2, 2',2",2'''.

In a preferred embodiment, the algorithm is configured to calculate the corrected digital force sensor signal 102 from the vehicle trajectory information 123 and at least one digital force sensor signal 101 of the wheels of a vehicle 2, 2',2",2''' crossing the WIM sensor 5 and at least one further measurement variable; wherein said further measurement variable may be, but is not limited to, a temperature that is detected by a temperature probe 16 as the temperature probe signal 130, converted by an A/D converter 11 and provided in a digital form as the digital temperature probe signal 131. The algorithm is configured to correct the digital force sensor signal 101 on the basis of the predetermined temperature dependency of force sensor 13 whereafter the algorithm is configured to calculate the difference between the force component described above which is proportional to the radial acceleration or acceleration of the vehicle 2, 2',2",2''' and the weight of the vehicle 2, 2',2",2''', and the digital force sensor signal 101 and to provide the result as the corrected digital force sensor signal.

In a preferred embodiment, in the case of positive presence information 121 all available corrected digital force sensor signals 102 are assigned to the vehicle 2, 2' 2" 2''' by an algorithm in the microprocessor 8 or in the external evaluation member 7.

An algorithm in the external evaluation member 7 schematically shown in FIG. 6 is configured to determine the corrected axle load of all axles and the corrected total load of the vehicle 2, 2"',2'''', 2'''' and to provide them in a digital format. Using these corrected digital force sensor signals 102 for this determination increases the measurement accuracy of the measurement of the wheel loads, axle loads and total load of a vehicle 2, 2',2",2''' in accordance with the present invention.

In one embodiment schematically shown in FIGS. 3, 6, 7 and 8 for example, WIM sensor 5 comprises an electronic signal transmission member 15; wherein in a preferred embodiment a connection member for a conductor is arranged at the electronic signal transmission member 15 where a conductor is used to transmit signals provided in the WIM sensor to an external evaluation unit 7; wherein in a preferred embodiment a transmitter and receiver for electromagnetic waves is arranged at the signal transmission member 15; wherein the signal transmission member 15 is configured to transmit signals provided in the WIM sensor 5 by electromagnetic waves to an external evaluation member 7. An external evaluation member 7 is a laptop or a personal computer or a decentralized IT infrastructure, for example.

In a further embodiment, a power supply 14 is arranged in at least one chamber 20 in a preferred embodiment as shown in FIG. 7; wherein power supply 14 supplies electrical power to at least one electronic member of the WIM sensor 5.

In a preferred embodiment, this list of electronic members that can be energized by the power supply 14 comprises, however, is not limited to at least one of the following members: force sensor 13, electro-acoustic transducer 10, A/D converter 11, signal transmission member 15, and temperature probe 16.

Of course, there may be also electronic members performing different functions that are present in the form of a single electronic component such as an application-specific integrated circuit, shortly called ASIC. There may be also a plurality of electronic members performing similar functions in the form of a single electronic component.

In one embodiment of the WIM sensor 5, power supply 14 is the only source of electrical power for the WIM sensor 5. In another embodiment, power supply 14 is an additional source of electrical power for the WIM sensor 5, for example an uninterruptible power supply or a general backup power supply; wherein in the latter case there will be a brief interruption in power supply in the event of a mains voltage failure before power supply 14 starts providing power automatically.

In an advantageous embodiment, power supply 14 supplies electrical power to at least one electronic member arranged in the roadway segment 1.

Stopping the supply of electrical power to an electronic member is referred to below as switching off the power supply 14 of that electronic member even if the power supply 14 continues to supply electrical power to other electronic members. Likewise, restarting the supply of electrical power to the electronic member is referred to below as switching on the power supply 14 of that electronic member. Furthermore, reducing the power supply 14 of an electronic member with electrical power is referred to below as reducing the power supply 14 of that electronic member.

The algorithm in microprocessor 8 is configured to switch on or off the power supply 14 of at least one electronic member arranged in roadway segment 1 or switches at least one electronic member arranged in roadway segment 1 from an operating mode into a low-energy mode in which low-energy mode the energy consumption of the electronic component is lower than in the operating mode.

Power supply 14 provides electrical power during a power supply runtime which power supply runtime ends when the power supply 14 is largely discharged.

In an advantageous embodiment, the presence information 121 is used to adapt the power supply 14 of individual electronic members or groups of electronic members of the WIM sensor 5; said adaptation being in particular reducing or switching off the power supply 14 whereby the runtime of the power supply is significantly increased. If no presence of a wheel 11 is detected on a roadway segment 1, the algorithm in microprocessor 8 is configured to switch off or to reduce the power supply 14 to at least one electronic member arranged in the roadway segment 1 which electronic member is not required for detecting a presence of a wheel 11 on the roadway segment 1. If a presence of a wheel 11 on the roadway segment 1 is detected, the switched-off or reduced power supply 14 is switched on again. Switching off or reducing the power supply 14 extends the power supply runtime of power supply 14. In an advantageous embodiment, the algorithm is configured so that switching or reducing of the power supply 14 of at least one electronic member arranged in the roadway segment 1 is carried out by the algorithm on the basis of the presence information 121.

In a preferred embodiment, the evaluation of at least one digital transducer signal 111 enables a detection of the current sound exposure level. The detection of the current sound exposure level is performed by the algorithm in the microprocessor 8 or by the external evaluation member 7, wherein the algorithm is configured to determine the sound pressure level of a digital transducer signal 111. The sound emission level of a crossing vehicle 2, 2',2",2''' is then determined from the sound pressure level. The sound emission level is compared to a preset sound emission limit value. The result of this comparison is provided as the sound signal and is transmitted by a signal transmission member to an external evaluation member or to a laptop or personal computer or to a decentralized IT infrastructure via the Internet.

In a further embodiment, at least one acoustic signal generator 12 is arranged in space 21 of the profile 6 as shown in FIG. 8; which acoustic signal generator 12 generates acoustic signals with frequencies in the ultrasonic range between 21 kHz and 1 GHz; which acoustic signal generator 12 is an additional source of sound waves that exists in addition to the above-mentioned sources of sound waves originating from a vehicle 2, 2' 2" 2'''; which sound waves generated by the acoustic signal generator 12 propagate in a well-known manner and are reflected on elements of a vehicle 2, 2' 2" 2'''. Thus, sound waves originating from the acoustic signal generator 12 are detected by at least one electro-acoustic transducer 10 in addition to the sound waves generated by a vehicle 2, 2' 2" 2''', wherein the detected sound waves of an acoustic signal generator 12 are used to detect the presence of a vehicle 2, 2' 2" 2''' in the same way as the sound waves generated by a vehicle 2, 2' 2" 2'''. Acoustic signal generator 12 is controlled by the algorithm in the microprocessor 8 whereby the algorithm controls the frequency, duration and intensity of the sound waves generated by the acoustic signal generator 12.

However, those skilled in the art knowing the present invention may insert a plurality of WIM sensors 5 with electro-acoustic transducers 10 spaced apart from each other in a roadway. Digital transducer signals 111 and digital force sensor signals 101 are detected in the external evaluation member 7; wherein by detecting the digital transducer signals 111 and digital force sensor signals 101 of a plurality of WIM sensors 5 it is possible to increase the measurement accuracy; wherein by detecting the digital transducer signals 111 and digital force sensor signals 101 of a plurality of WIM sensors 5 it is possible to check the detected signals for consistency.

In a further preferred embodiment of the WIM sensor 3 schematically shown in FIG. 6 for example, at least one digital transducer signal 111 is stored at a configurable time interval in a temporally synchronized manner with at least one digital force sensor signal 101 and with a time stamp 141 in the non-volatile memory member 9 or the external evaluation member 7 wherein a time stamp 141 consists of a date and a time and is provided by the algorithm in the microprocessor 8.

LIST OF REFERENCE NUMERALS 1 roadway segment 2, 2',2",2''' vehicle, vehicle with trailer, vehicle composition
3 WIM sensor
4, 4',4",4''' additional external sensors for vehicle presence detection
5 WIM sensor in a first advantageous embodiment
6 profile 7 external evaluation member
8 microprocessor
9 non-volatile memory member
10 electro-acoustic transducer
11 A/D converter
12 signal generator
13 force sensor
14 power supply
15 signal transmission member
16 temperature probe
20 space
21 space
100 force sensor signal
101 digital force sensor signal
102 corrected digital force sensor signal
110 transducer signal
111 digital transducer signal
121 presence information
122 vehicle position information
123 vehicle trajectory information
125 phase information
126 load information
130 temperature probe signal
131 digital temperature probe signal
P1 a first position
P2 a second position
v1 a first speed
v2 a second speed
v3 a third speed
T a trajectory
XX' direction of travel
YY' longitudinal axis
ZZ' vertical direction

The invention claimed is:

1. A WM sensor for detecting loads of vehicles on a roadway segment when a wheel of a vehicle crosses the WM sensor when the WIM sensor is arranged flush with a roadway surface of the roadway segment, the WM sensor comprising:
    a profile that elongates along a longitudinal axis and defines therein at least a first space;
    a force sensor disposed in the first space of the profile and configured to generate a force sensor signal that corresponds to a dynamic ground reaction force when the wheel crosses the force sensor and exerts a force onto the roadway segment:
    a first electro-acoustic transducer arranged in the first space and configured to measure sound waves and accordingly generate a transducer signal; and
    a first A/D converter arranged in the first space and configured to convert the transducer signal of the first electro-acoustic transducer into a digital transducer signal; and a second A/D converter arranged in the first space of the profile and configured to convert the force sensor signal into a digital force sensor signal.

2. The WIM sensor according to claim 1, wherein the first electro-acoustic transducer has a sensitivity in a specific frequency band in the audible range from 20 Hz to 21 kHz, limits included.

3. The WIM sensor, according to claim 1, further comprising a microprocessor disposed in a chamber defined in the profile and spaced apart from the first space; a non-volatile memory member is arranged in the chamber; wherein the microprocessor is configured to detect the digital transducer signal in a temporally synchronized manner with the digital force sensor signal; an algorithm is stored on the non-volatile memory member; wherein the microprocessor is configured to load the algorithm from the non-volatile memory member and evaluate the detected digital transducer signal and the detected digital force sensor signal by means of the algorithm and generate an evaluation therefrom.

4. The WIM sensor according to claim 3, further comprising an external evaluation member disposed remotely from the profile and wherein the non-volatile memory member or the external evaluation member stores at a configurable time interval the digital transducer signal in a temporally synchronized manner with the digital force sensor signal and with a time stamp that consists of a date and a time.

5. The WIM sensor according to claim 4, further comprising a signal transmission member disposed in the chamber of the profile and configured to transmit the digital force sensor signal to the external evaluation member by means of at least one electrical conductor or by means of electromagnetic waves.

6. The WIM sensor according to claim 3, further comprising a power supply arranged in the first chamber and configured to supply electrical power to at least one electronic member arranged in the roadway segment; wherein the algorithm in the microprocessor is configured to switch on or off the power supply to the at least one electronic member arranged in the roadway segment; wherein the algorithm is configured to turn on the power supply to provide electrical power during a power supply runtime that ends when the power supply is largely discharged.

7. The WIM sensor according to claim 6, wherein the algorithm is configured to control the power supply to switch the electronic member from an operating mode to a low-power mode in which low-power mode the power requirement of the electronic member is reduced compared to the operating mode; and in that reducing the power supply to the electronic member extends the power supply runtime.

8. The WIM sensor according to claim 3, further comprising an electro-acoustic signal generator arranged in the first space and configured to generate sound waves with a frequency in the frequency band from 21 kHz to 1 GHz; wherein the algorithm in the microprocessor is configured to control the frequency, duration and intensity of the sound waves generated by the electro-acoustic generator; and wherein the electro-acoustic transducer is configured to detect the sound waves generated by the electro-acoustic generator and the sound waves generated by a vehicle in generating the transducer signal.

9. The WIM sensor according to claim 1, wherein the first electro-acoustic transducer has a sensitivity in a specific frequency band in the ultrasoundrange from 21 kHz to 1 GHz, limits included.

10. A method for detecting a presence of vehicles on a roadway segment having a surface flush with a WIM sensor that includes a profile defining a space containing a force sensor, at least one electro-acoustic transducer, and a microprocessor running an algorithm, the method comprising the steps of:
    using the algorithm to compare a digital transducer signal to at least one characteristic signature for the presence of a vehicle passing over the WIM sensor wherein said characteristic signature being at least one known predefined signal level in at least one predefined frequency range of the digital transducer signal; and wherein when the comparison finds the characteristic signature then the algorithm generates positive presence information that indicates a presence of a vehicle on the roadway segment;

using the algorithm to compare the digital transducer signals of at least three electro-acoustic transducers on the basis of their shape and using the algorithm to determine a temporal offset of two recognized shapes of two digital transducer signals to calculate a time difference in the arrival time of the two detected digital transducer signals;

using the algorithm to calculate a time difference in the arrival time of three transducer signals from different electro-acoustic transducers to calculate a phase information;

using the algorithm to employ the phase information for calculating the position of a vehicle on the roadway segment; and using the algorithm to provide a calculated position of the vehicle as the vehicle position information.

11. The method according to claim 10, further comprising the steps of: from a time sequence of vehicle position information using the algorithm to calculate a trajectory of the vehicle in the vicinity of the WIM sensor which trajectory is a time-dependent mathematical trajectory in a three-dimensional coordinate system; and using the algorithm to provide a calculated trajectory of the vehicle as the vehicle trajectory information.

12. The method according to claim 11, further comprising the steps of: using the algorithm to calculate a corrected digital force sensor signal from the vehicle trajectory information and the digital force sensor signal; using the algorithm to calculate a first derivative of the trajectory with respect to time which is the speed of the vehicle in the vicinity of the WIM sensor; using the algorithm to calculate a second derivative of the trajectory with respect to time which is the acceleration or radial acceleration of the vehicle in the vicinity of the WIM sensor wherein said acceleration occurs when the vehicle brakes or increases its speed, wherein said radial acceleration occurs when the vehicle drives through a bend; using the algorithm to employ the vehicle trajectory information to calculate the acceleration or radial acceleration of the vehicle at the position of the force sensor; from the force that a wheel exerts on the force sensor detected by the digital force sensor signal and the acceleration or radial acceleration using the algorithm to calculate a fraction of the force or shortly the force component caused by the acceleration or radial acceleration of the vehicle; using the algorithm to calculate a difference between this force component and the determined digital force sensor signal; and from this difference using the algorithm to generate a corrected digital force sensor signal whereby the corrected digital force sensor signal is independent of the force exerted on the roadway segment by the acceleration or radial acceleration of the vehicle.

13. The method according to claim 11, further comprising the steps of: using the algorithm to calculate a corrected digital force sensor signal from the vehicle trajectory information together with a digital temperature probe signal and the digital force sensor signal; using the algorithm to calculate a first derivative of the trajectory with respect to time which is the speed of the vehicle in the vicinity of the WIM sensor; using the algorithm to calculate a second derivative of the trajectory with respect to time which is the acceleration or radial acceleration of the vehicle in the vicinity of the WIM sensor wherein said acceleration occurs when the vehicle brakes or increases its speed, wherein said radial acceleration occurs when the vehicle drives through a bend; using the algorithm to employ the vehicle trajectory information to calculate the acceleration or radial acceleration of the vehicle at the position of the force sensor; using the algorithm to correct the digital force sensor signal on the basis of the predetermined temperature dependency of the force sensor whereafter the algorithm uses the force that a wheel exerts onto the force sensor determined by the digital force sensor signal to calculate the force component which is caused by the acceleration or radial acceleration of the vehicle; using the algorithm to calculate a difference between this force component and the digital force sensor signal corrected on the basis of the predetermined temperature dependency of the force sensor; from this difference using the algorithm to generate a corrected digital force sensor signal that is independent of the force exerted onto the roadway segment by the acceleration of the vehicle and of the temperature of the force sensor.

14. The method according to claim 11, further comprising the steps of: using the algorithm to calculate a sum of the wheel loads of the wheels of a vehicle by employing the corrected digital force sensor signals to generate the vehicle trajectory information; the algorithm uses this sum to calculate the total load of the vehicle which the algorithm provides as the load information; wherein the algorithm determines the wheels belonging to a vehicle from the vehicle trajectory information; whereby the algorithm increases the measurement accuracy of the total load of a vehicle as compared to a WIM sensor without vehicle trajectory information.

* * * * *